April 26, 1966  G. J. SHOMPHE  3,248,688
BALL CONFIGURED ELECTRONIC DEVICE
Filed April 24, 1963  4 Sheets—Sheet 1
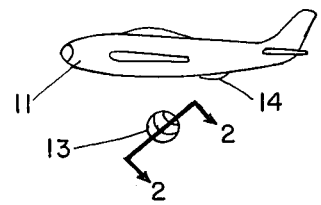
FIG. 1
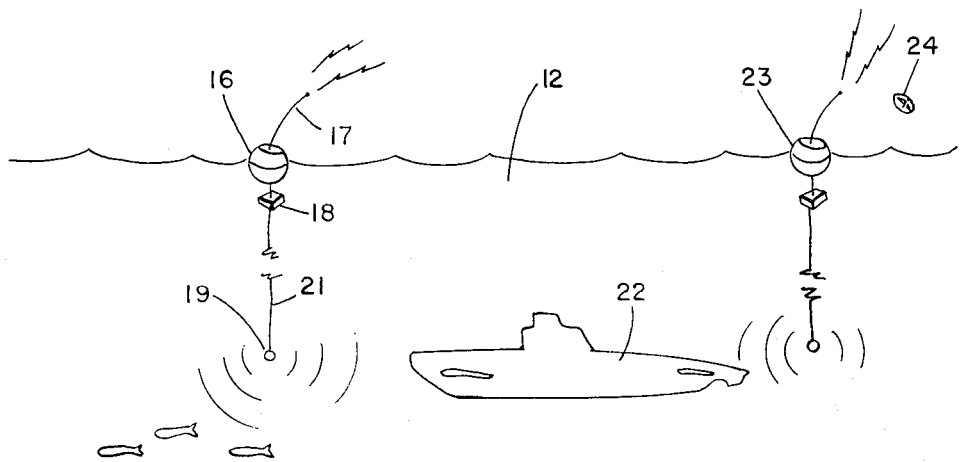
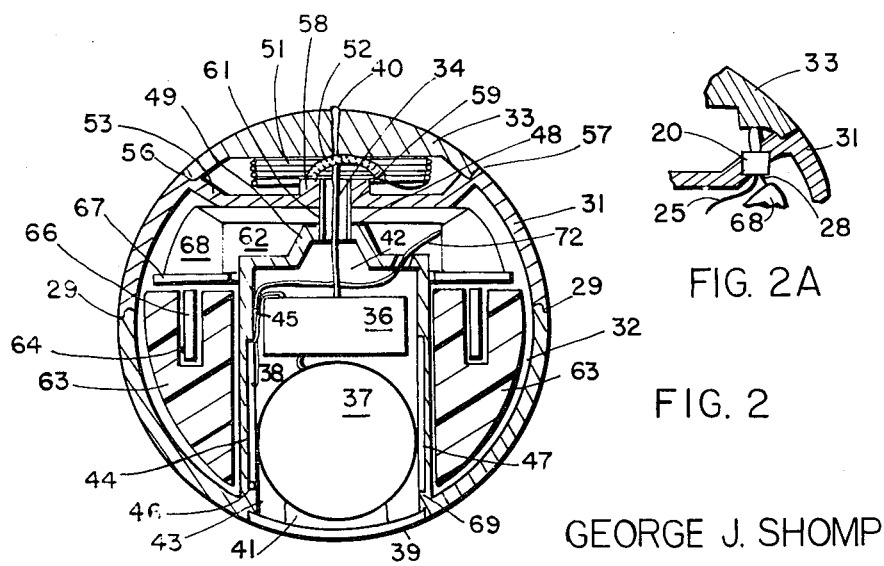
FIG. 2A
FIG. 2
GEORGE J. SHOMPHE
INVENTOR April 26, 1966  G. J. SHOMPHE  3,248,688
BALL CONFIGURED ELECTRONIC DEVICE
Filed April 24, 1963  4 Sheets-Sheet 2

GEORGE J. SHOMPHE
INVENTOR
BY

April 26, 1966 G. J. SHOMPHE 3,248,688
BALL CONFIGURED ELECTRONIC DEVICE
Filed April 24, 1963 4 Sheets-Sheet 3

GEORGE J. SHOMPHE
INVENTOR

BY *Harold P. Williams*

GEORGE J. SHOMPHE
INVENTOR
BY

United States Patent Office 3,248,688
Patented Apr. 26, 1966

3,248,688
BALL CONFIGURED ELECTRONIC DEVICE
George J. Shomphe, Nashua, N.H., assignor to Sanders Associates, Inc., Nashua, N.H., a corporation of Delaware
Filed Apr. 24, 1963, Ser. No. 275,435
14 Claims. (Cl. 340—2)

This invention relates to a ball configured electronic package capable of being placed on the surface of a body of water by an air drop approach or by underwater release with buoyant rising.

More specifically, this invention relates to an air launched free-falling sonobuoy.

In one specific embodiment this invention relates to a free-falling electronic device buoy having a spherical shape and having mechanisms therein to provide for an antenna release simultaneously with a transducer ejection upon impact with the water.

In the past, the mission of underwater detection of submerged craft has been accomplished with hydrophones located beneath the surface of the water. These hydrophones in most instances were launched from low-flying aircraft at moderate velocities. The entire package of hydrophone transmitter and power source was housed in long cylindrical packages, most of which have a total length in excess of two feet and a diameter of six inches. When these cylindrical sonobuoys were launched, their size, weight, and velocities were such that each unit required an additional parachute or rotor chute in order that sufficient deceleration accompany the descent, lest the sonobuoy destroy itself on impact. The presence of the retrochutes of the above type added spurious impacts to the sonobuoys in flight trajectory needed to accurately locate the sonobuoy in the water. While the retrochutes had to be designed to provide sufficient deceleration, there was still a pressing need for a sufficient water impact force to counter the inertial forces present in the hydrophone and related power supply in order that the inertia responsive release mechanism of the buoy provide for the hydrophone and power supply escape into the water. In the past, the hydrophone release required that there be a complete reversal of inertial forces on the hydrophone. This total reversal of inertia forces produced an inherent decrease in the hydrophone submergence rate, as the submergence rate became dependent solely on the force of gravity. Once the cylindrical buoys were in the water, the action of wave forces produced undesirable bobbing and waving of the sonobuoy antenna with a concomitant loss of transmitter effectiveness.

The flight storage problems also beleaguered the users of the cylindrical sonobuoys who were hampered by the buoy's cumbersome size. Since there are various types of sonobuoys to accomplish different functions, the in-flight selection and handling in cramped quarters proved difficult.

In response to the enormity of problems outlined above, the invention to be described hereafter has come into existence and has brought a unique solution to the aforementioned troubles.

It is therefore an object of this invention to provide a free-falling sonobuoy which has a most compact form.

Another object of this invention is the provision of a free-falling sonobuoy whose construction provides the strongest water impact configuration and also allows a highly accurate predetermined flight path.

Another object of this invention is to provide a free-falling sonobuoy whose in-flight aerodynamic stability is great and whose in-flight stabilizer does not project past a uniformly located loci of points which define a sphere.

Another object of this invention is the provision of a water impact antenna release unit and a simultaneous hydrophone ejection which maximizes hydrophone descent.

And yet, another object of this invention is the provision of sonobuoy flotation stability by utilizing a combination of fluid dampening and a balanced in-water configuration.

Another object of this invention is the provision of a completely sealed sonobuoy which can withstand high velocity water impact forces due to its configuration and shock resistant mounting of internal electronics.

Another object of this invention is the provision of a floating buoy which has means to effect a righting action on the buoy when wind and water force try to capsize the buoy.

Another object of this invention is the provision of an underwater released electronic package whose flotation characteristics are excellent.

Another object of this invention is the provision of a compact water tight sonobuoy containing a plurality of transducer elements, or alternatively one or more active components.

For a better understanding of the present invention together with other and further objects thereof, reference is made to the following description taken in connection with the accompanying drawings; and its scope will be pointed out in the appended claims.

In the drawings:

FIG. 1 is a cross-sectional illustration of a sonobuoy launching in an operational environment.

FIG. 2 is a cross-sectional view of a sonobuoy embodying the invention taken along the lines 2—2 of FIG. 1.

FIG. 2A is a partial section of another embodiment of the invention.

Figure 3:
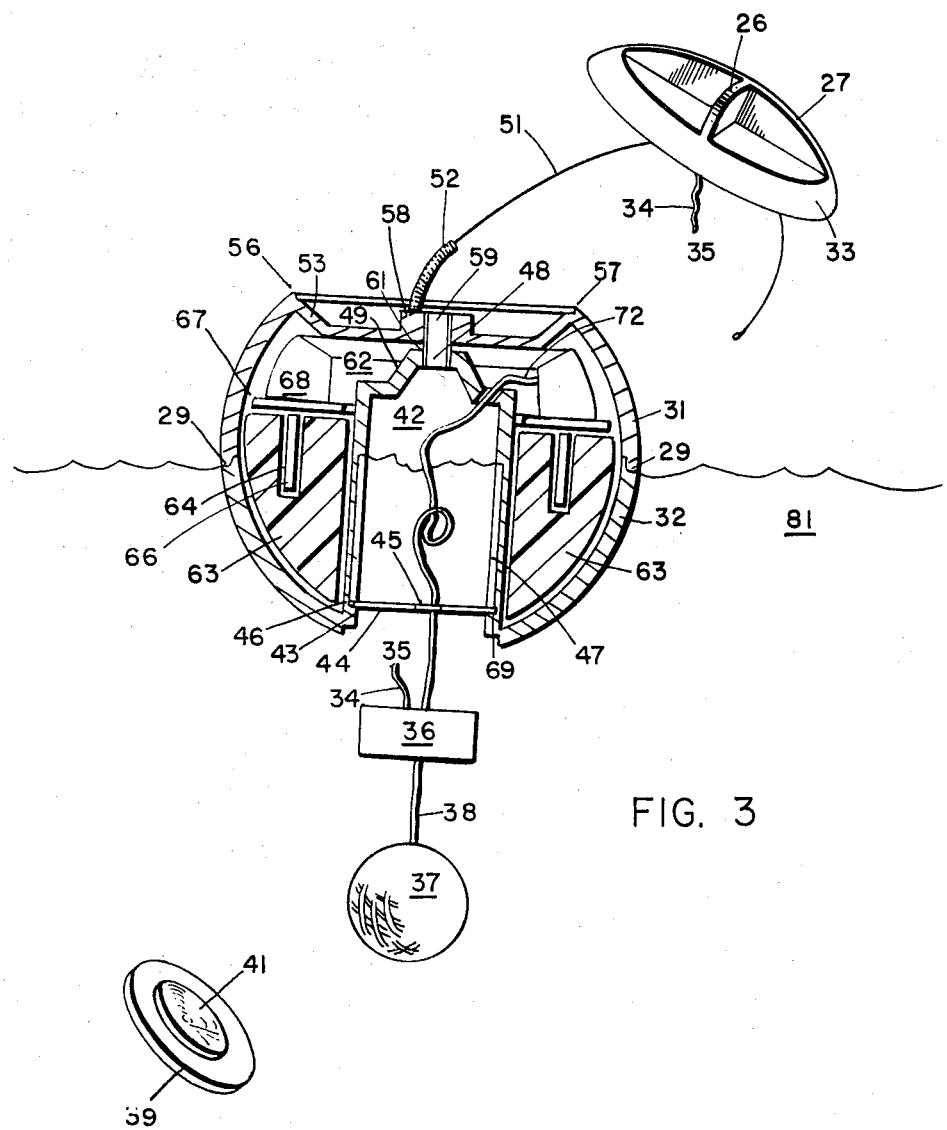
FIG. 3 is a partial schematic section of a sonobuoy embodying the invention in an operational environment.

Referring now to FIG. 1, there is depicted an illustration of a sonobuoy launching in an operational environment, which is one use of the invention. A sonobuoy launching aircraft 11 is travelling over the ocean 12 on a typical reconnaissance mission, where the prime object is the location of a submerged submarine 22 located at a point some distance below the ocean surface. The sonobuoy launching aircraft 11, as shown, is in the process of launching a spherical sonobuoy 13 from a launching portal 14. Spherical sonobuoys of the type shown being launched in FIG. 1 embodying the invention have on a prior pass over the submarine been launched from plane 11; and two such spherical sonobuoys 16, 23, in a predetermined pattern, are depicted floating in the ocean 12. A first operating sonobuoy 16 is shown having released a salt water battery 18 and a transducer 19 which may be a hydrophone which is interconnected to the salt water battery 18 by a conductive support wire 21. The hydrophone 19 is a listening device capable of detecting underwater sounds and communicating the information via the conductive support wire 21 and the sonobuoy 16 to an antenna 17, which in turn transmits the message indicative of the information received by the hydrophone 19. The entire spherical buoy in this application is not larger than six inches in diameter.

In the right hand portion of FIG. 1 there is illustrated a second operating sonobuoy 23, which sonobuoy has just struck the surface of the ocean 12 and has released both an antenna and a hydrophone. In so doing it has also ejected a flight stabilizing cap 24. The form of the flight stabilizing cap 24 will be discussed more fully hereafter, along with a detailed description of the mechanisms needed to erect the antenna 17 and eject the hydrophone 19 and related salt water battery 18.

At this point it is worthwhile to note that the precision with which the sonobuoys, once launched, locate their underwater targets is dependent upon the path in which the sonobuoys are deposited on the ocean's surface. The trajectory of the launched buoy is critical, and if the buoy should over-shoot the intended area or on the other hand under-shoot an indicated area, its function as a reference information source is signficantly diminished.

As earlier noted, sonobuoy launching and related descent have had their fall controlled by the presence of a parachute or alternatively a rotor chute which have acted to slow the descent, but also tend to be greatly affected by the presence of various wind conditions at the time of the launch.

The invention involved herein is embodied in part in the spherical contour of the sonobuoy which presents what is believed to be the best configuration for an air-to-sea sonobuoy. The spherical shape permits the strongest configuration capable of withstanding the water entry and related shock. The spherical shape also permits a decrease in air resistance which inherently enhances the trajectory of the launched sonobuoy. It is of course to be noted that the sonobuoy is not slowed in any manner during the descent. The fact that the sonobuoy is of a free-falling configuration allows this sonobuoy to avoid the expensive addition of a parachute or rotor chute, and lessens the effect of wind during flight.

Integrally mounted into the sonobuoy are a plurality of vanes to be described in detail more fully hereafter, the vanes acting to stabilize aerodynamically the in-flight characteristics of the buoy. The spherical sonobuoy has as an inventive feature of its design the location of its center of gravity at a point remote from the geometrical center of the spherical buoy, the center of gravity being located in a direction diametrically opposite to the finned aerodynamic stabilizer noted above. The position of center of gravity location, coupled with the aerodynamic stability afforded by the vanes, establishes a unit that takes on aerodynamic qualities never before realized in a sonobuoy of the prior art.

Referring now to FIG. 2, there is illustrated a cross-sectional view of the sonobuoy 13 shown in FIG. 1. The spherical sonobuoy is comprised of two major components—an upper shell 31 and a lower shell 32 which collectively define a spherically shaped unit. These shells can be fabricated from injection molded plastic or any other suitable material having a strength sufficient to withstand water impact forces, the upper shell and lower shell being bonded one to another at a seam 29. This seam 29 may be comprised of a suitable cement. At the upper portion of the spherically shaped ball, which is defined by the upper and lower shells 31, 32, is a flight stabilizing cap 33, which cap will be described in greater detail in conjunction with the detailed description of FIG. 3. As just noted, the flight stabilizing cap 33 fits directly on upper shell 31 and relies on grooved mating portions 56 and 57 in the upper shell 31 for its positioning on the sonobuoy.

The unit depicted in FIG. 2 is typical of a unit prior to water impact and illustrates schematically the internal arrangement and configuration present in a spherical sonobuoy which embodies the invention. Directly beneath the flight stabilizing cap 33, secured in a recessed upper shell portion 53, is a coiled antenna 51, which antenna has a coiled spring base portion 52, shown clearly in FIG. 3, which spring has a high resilient quality. The coil spring base portion 52 is integrally mounted on a raised protuberance 58 centrally disposed within the recessed upper shell portion 53. The raised protuberance 58 has an opening 59 therein which permits the passage of an antenna release wire 34, which wire 34 is secured to flight stabilizing cap 33 by a soldered bead joint 40 in the cap 33.

The lower end of the antenna wire 34 is attached to a battery 36 which relies on the generation of electric power by the co-operation of the salt water medium and the mtaerials therein to produce an electric current which powers the sonobuoy transmitter to be described hereafter.

Figure 7:
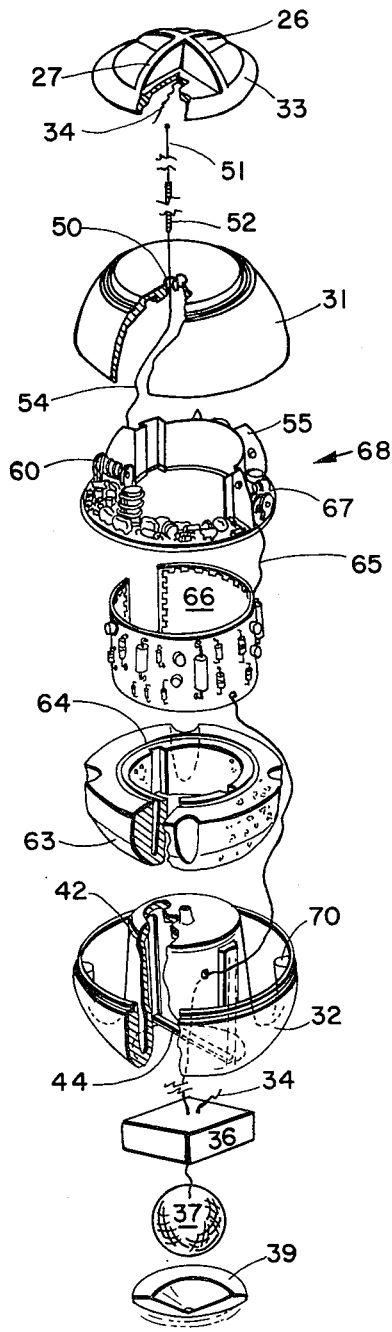
FIG. 7 is an exploded view of an entire sonobuoy embodying the invention.

Integrally connected to the salt water battery 36 by a conductive support wire 38 is a hydrophone 37, which hydrophone functions as a listening device to detect any underwater sounds being emitted by a submerged vessel. The hydrophone 37 relies on its support within the lower shell 32 on the hydrophone release cap 39, which release cap has a dish-shaped portion 41 acting to position the spherical contour of the wire wound hydrophone 37. The circular-shaped hydrophone has taken this shape as a result of conductive support wire 38 being wound around the hydrophone 37. The battery 36 and hydrophone 37 are maintained in geometrical alignment by centrally disposed walled cavity 42, which walled cavity has side walls such as 43 which will subsequently act to control the direction in which the hydrophone is ejected from the sonobuoy. A support arm 44, whose functions will be described more fully in conjunction with FIG. 3, is supported by a pivoted member 46 in the lower portion of the walled cavity 42. The support arm 44 has a transmitter lead wire 72, which electrically interconnects a transmitter 68 with batttery 36 and hydrophone 37. Within the upper shell 31 is the buoy transmitter cavity 62. This buoy transmitter cavity 62 is isolated from the walled cavity 42 by a fluid sealing sleeve 61. Located in the lower shell 32 is a toroidal shaped shock mount 63 which has in its upper surface an annular slot 64. The transmitter 68 noted above is securely fixed to a circular transmitter support disk 67 which in turn is mounted on lower shell support members not shown in FIG. 2 or FIG. 3. These lower shell support members are shown in FIG. 7 and will be discussed more fully hereafter. The cylindrical sleeve 66 is formed of flexible printed circuitry and has mounted thereon a number of electronic components not shown in FIG. 2 or FIG. 3, but illustrated in FIG. 7. The transmitter 68 and cylindrical sleeve 66 may be placed in position and an expanding foam insulation may be injected into the sphere to thereby provide a mechanical and electrical shock support for the transmitter 68 and related sonic amplifier sleeve 66.

Referring now to FIG. 3, there is depicted a spherical sonobuoy in its operational environment moments after water impact. With respect to comments concerning FIG. 3, like numerals will designate the same parts as set forth with regard to the description of FIG. 2. FIG. 3 is a schematic representation of the sonobuoy's antenna erection and hydrophone release operation. As can be seen, antenna 51, which was securely coiled within the upper shell 31 in its recessed upper shell portion 53, is now in a semi-extended condition, the antenna 51 being driven at the instant illustrated to a position of erection by coil spring base portion 52, which as noted above is a highly resilient and flexible member.

The release of the antenna is effectuated through the following physical occurrences. As the spherical sonobuoy approaches the surface of the ocean 81, the hydrophone 37 and battery 36 have developed an inertial force which is a function of the mass and acceleration. When the buoy strikes the surface of the water the relative area presented by the hydrophone release cap 39, as compared with the projected area of the lower shell 32, is such that a resultant inertial hydrophone force appears directly on the dish shaped portion 41 of the hydrophone release cap 39. This force is great enough to break free the hydrophone release cap 39 from its tight fit in the bottom of the walled cavity 42, and as can be seen in FIG. 3, the hydrophone 37 has driven the hydrophone release cap 39 into the ocean. Simultaneously with the passage of the hydrophone into the ocean the antenna release wire 34, which is securely fastened to the battery 36 and which passes throught the raised protuberance opening 59 to be secured by a beaded soldered joint 40 in the flight stabilizing cap 33, is designed to be broken due to the inertial forces present in the hydrophone 37 and related battery 36. Once the antenna release wire 34 is broken, as at 35, the stored spring energy in the coiled spring base portion 52 and antenna 51 can be released, and in so releasing, the antenna is flexed into an erect position ejecting the flight stabilizing cap 33 into the ocean where it is lost.

As has been noted, once the antenna release wire 34 has been broken, the hydrophone unit which is comprised of a hydrophone tightly wrapped with a conductive support wire 38 starts its descent into the depths of the ocean 81. The battery and its transmitter lead wire 72, which is fastened to support arm 44 at a lead connection 45, cause the support arm 44 to pivot at pivotal member 46 from a position parallel with the walled cavity 42 and its side wall 43 into a perpendicular position across the walled cavity 42. The support arm 44 comes to a rest on a stop lip 69 and thereby effectuates the positioning of the battery 36 a predetermined distance beneath the buoy depending upon the length of the transmitter wire 72 from the support arm transmitter lead connection 45.

The securing of the salt water battery 36 in a pendulous position beneath the buoy is important to the invention because it provides, in part, a means to floatation stabilize the entire buoy. The righting action of the battery hanging beneath the buoy coupled with the passage of ocean water 81 into the walled cavity 42 functions to provide a unique fluid damping. This damping arises because of the presence of dynamic fluid sheer between the lower shell 32, side wall 43, and the ocean 81 itself. The physical stabilization of the buoy brought about by the pendulous nature of the battery 36 coupled with the fluid damping noted above provides a sonobuoy whose flotation characteristics resist the most adverse wave conditions encountered at sea. The hydrophone utilized is a lightweight unit; this fact coupled with the resilient compliance in the hydrophone support wire permits the buoy to rise and fall with the waves without materially changing the positon of the hydrophone. Since the buoy is maintained in an erect position as the wind and the waves cause it to toss and bob, superior antenna transmission is accomplished.

The superior flotation characteristics of this buoy also make this type of buoy a highly desirable configuration for underwater release by a submerged craft. While it is understood that the impact hydrophone release mechanism will not be used, the use of water activated release mechanisms or electromechanical release devices will afford the needed antenna battery and hydrophone release.

Referring now to FIG. 2A, there is illustrated a partial section of another embodiment of the invention. While noted above that the use of a salt water activated battery is intended, the use of the invention may also be practiced with a self-contained power source, such as a mercury or cadminum cell. The use of a self-contained power source allows the electronic unit to be operated in both fresh water and salt water. The incorporation of a self-contained power source necessitates the addition of a switch to turn on the power to the transmitter upon water impact. This can be accomplished by the mechanism shown in FIG. 2A, in which there is shown a flight stabilizing cap 33 in position on upper shell 31. Mounted on the upper shell 31 is a transmitter power switch 20 which has a battery power lead wire 25 coming from a self-contained battery not shown. Extending from the switch 20 is a transmitter supply wire 28 which electrically connects the battery with the transmitter 68.

When the buoy strikes the water and the stabilizing cap 33 is ejected, the switch 20 closes and the power from the battery activates the transmitter.

The in-flight aerodynamic stabilizing of the buoy is made possible by the finned configuration of the flight stabilizer cap 33, which has integrally mounted thereon ribbed aerodynamic stabilizer fins 26 and 27. The size and nature of the fins represents another important aspect of the invention. And as can be seen from a study of the flight stabilizer cap 33, the fins 26 and 27 have been sculptured from the very cap itself, and at no point in their extension do the fins 26 and 27 exceed the predetermined loci of points which determine the outer boundaries of the spherical buoy. This is important because it lends to the buoy an element of compactness heretofore not obtainable in the prior art.

The buoy may be stored in any position, and in all positions it may be rolled or turned with complete freedom without being hampered by any fin projecting outside its spherical boundaries. This quality is particularly advantageous when the problem of storage while in flight is considered. The cramped quarters of a reconnaissance craft of the type depicted in FIG. 1 necessitate that every measure be taken to reduce the size and increase the ease of handling, for the ease in handling becomes a major contribution to swift and accurate launching of the sonobuoy. While the drawings do not illustrate buoy-launching means, it can be readily appreciated that the buoys may be mounted within the aircraft in tubular channels, and these tubular channels may have an opening therein which will permit the buoys to roll down the tubular channels and out a launching portal, such as that schematically designed as 14 in FIG. 1. As has been indicated earlier, different buoys with differing electronic characteristics are frequently employed. The in-flight selection of these different buoys is important to the successful mission of the aforementioned patrol reconnaissance craft. The compactness and the ability to store these units in separate cylinders gives the pilot of such a craft the ability to manually or automatically empty a different cylinder with a different buoy in any manner that will suit his mission.

The aerodynamic qualities of this spherical sonobuoy make it ideally suited for the launching from the decks of ships by rocket or by gun. The rocket configuration could feature the sonobuoy mounted in the rocket's nose, for example, and upon travel to a target area the spherical buoy would separate and continue its descent to the ocean. The shape of the buoy would also permit the buoys to be stored within the cylindrically shaped body of the rocket. Much in the same manner a launching would be effected by firing the spherical buoy from a deck gun. In this environment the rugged, compact buoy with its aerodynamic flight qualities would provide a highly accurate trajectory which would pin point remote target areas.

The detailed description of FIG. 2 set forth the physical cooperation of the transmitter 68 and its toroidal shape shock mount 63. The cylindrical shape of the transmitter's cylindrical sleeve permits a weight balanced design which is needed to give the spherical buoy the most desirable structural balance which is a requisite to the accurate control of flight trajectory after launching.

Figure 4:
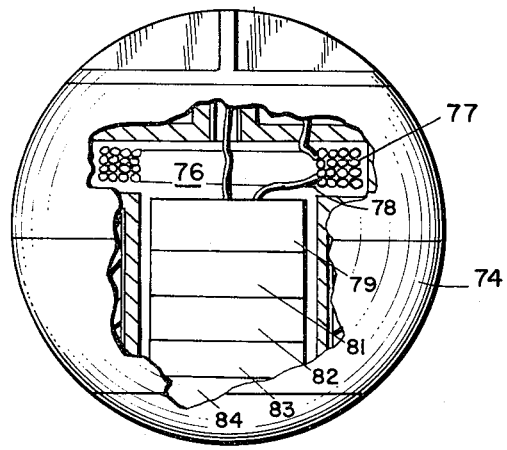
FIG. 4 is a partial section of another embodiment of the invention.

Referring now to FIG. 4, in which there is shown a partial section of another embodiment of the invention it will be seen that the spherical buoy 74 has an expanded walled cavity 76 in the upper shell 75. This expanded walled cavity 76 permits the storage of a large supply of conductive wire 77. This large supply of conductive wire 77 facilitates a most compact arrangement of battery 79 and a plurality of hydrophones 81, 82, 83, 84, the battery being integrally connected by a battery connection portion of the connective support wire 78 and wire (not shown). Each hydrophone is in turn connected electrically by a wire (not shown) to the battery and transmitter wire 77. This arrangement allows the storage of a number of electronic units. In this example, the hydrophones are to be dropped in series one after each other, at varying depths beneath the ocean surface, dependent upon where they are fastened on the wire. This same function could also be facilitated by the storage of a plurality of wire wound devices packed into the walled cavity.

At this point it should be mentioned while FIG. 4 shows a plurality of hydrophones and represents a sonobuoy of a passive or listening nature, it is intended that within the spirit of this invention the hydrophone may well have substituted therefore active electronic or sound producing components which send out emitted signal information to be reflected from submerged craft. A situation in which these active or sound producing devices are needed arises when the submerged craft is in a state of complete silence as when all systems on the submerged craft are shut down and thereby fail to produce any noise which might be detected by a hydrophone. It is further contemplated that it is within the spirit of this invention that a number of these spherical buoys may be dropped with active signal producing devices and then when these groups of active devices are functioning, the reflected signal from the submerged craft will be detectable by passive sonobuoy dropped at the same time, the result being that the information received by the passive sonobuoy hydrophone, which in turn is transmitted, will facilitate the precise location of silent underwater craft.

Figures 5, 6:
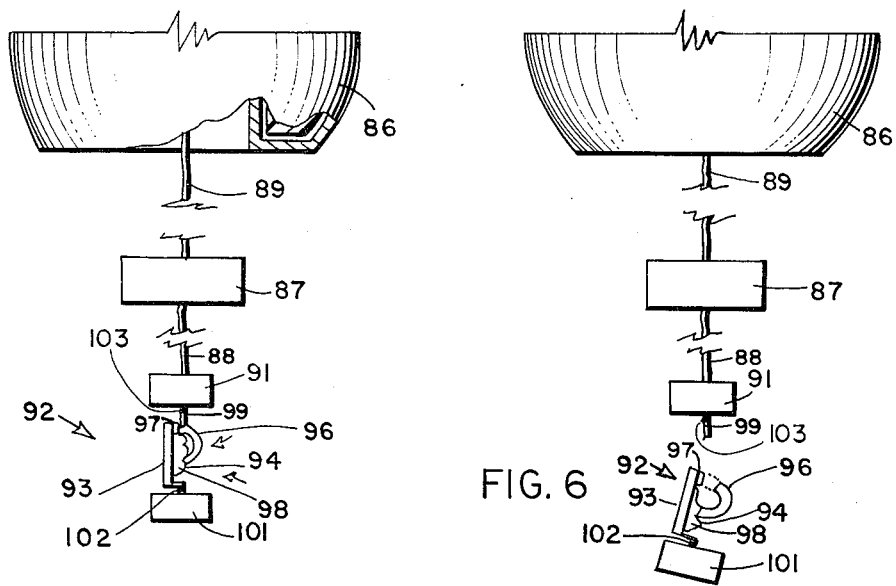
FIG. 5 is a partial showing of another embodiment of the invention illustrating a pressure release mechanism.
FIG. 6 is a partial showing of another embodiment of the invention illustrating a pressure release mechanism in a released condition.

Referring now to FIG. 5 and FIG. 6, there is designated another embodiment of the invention. There are situations that arise in which control of the hydrophone or electronic gear rate of descent into the ocean is called for. Since the rate of descent into the ocean as noted above with reference to FIGS. 2 and 3 is dependent upon the inertial forces present in the hydrophone, the rate of descent may be therefore controlled by the addition or subtraction of weight to the hydrophone unit.

There are occasions when it is desired to have the hydrophone descend at one rate to a predetermined depth and then at a slower rate to a final depth. FIGS. 5 and 6 represent a schematic showing of a mechanical approach which will accomplish these unique demands. In FIG. 5 a partial schematic of a buoy 86 is shown with its battery 87 extended beneath the buoy being supported by conductive support wire 89. Beneath the battery 87 is a hydrophone 91 which the launchers of the sonobuoy have designed to travel to some predetermined depth within a designated time. The hydrophone 91 is integrally connected to the battery by conductive wire 88. In order that the velocity and rate of descent through the ocean water be increased, an addtional weight 101 has been fastened to the hydrophone 91 by way of pressure responsive release mechanism 92, the pressure responsive release mechanism being comprised of a rigid back plate 93 which has mounted on one side of it a bellows and a hammer member 96 which pinches a hydrophone projecting portion 99 against an anvil member 97. The hydrophone projection portion 99 has a pivotal section 103. At the base of the rigid back plate 93 is a second pivotal section 102. The two aforementioned pivotal sections allow the release mechanism 92 to be folded up with the hydrophone 91 thereby allowing the entire unit to be wrapped for storage with conductive support wire 88.

Referring now to FIG. 6, there is shown a release being effectuated at a predetermined depth. As the hydrophone 91 travels deeper into the ocean, the underwater pressure accordingly increases, as the pressure increases the bellows 94 is placed under increased compressive forces, the pressure made to collapse the bellows being readily calculatable and easily designed into the bellows. When the pressure responsive release mechanism and related hydrophone reach the predetermined design depth, the bellows collapses and in so doing pivots away the hammer 96 from its pinching position on hydrophone projecting portion 99 and frees the additional weight 101 to continue to the depths of the ocean.

At this point the rate of descent of the hydrophone 91 is controlled by the inertia present in the hydrophone itself. In some instances the depth to which the hydrophone is carried before the release is effectuated may in fact be the final operating depth of the hydrophone.

Referring now to FIG. 7, there is shown an exploded view of a typical sphere configured electronic package and all of its internal mechanisms. Where applicable, reference numerals used in FIG. 7 are the same as those used in the preceding figures. Starting with the bottom of FIG. 7, there is shown a hydrophone release cap 39 on which will rest a hydrophone 37 which is supported from battery 36. The battery 36 is shown electrically connected to cylindrical sleeve 66 which has electronic components mounted on this cylindrical flexible printed circuit sleeve member 66. The lower shell 32 illustrates a support arm 44 perpendicular to a centrally disposed walled cavity 42. Integrally mounted on the lower shell 32 are lower shell support members such as at 70 which act to support the transmitter 68 and its related support disk 67. A shock mount made up of mechanically rigid foam 63 has an annular slot 64 in which cylindrical sleeve 66 is mounted for purposes of isolating the electronic components affixed thereto from the shocks experienced at water entry. All of the electric components have been selected with a thought in mind of preventing damage from adverse loading at water impact. Accordingly, the liberal use of transistors and solid state devices aids in accomplishing the desired shock proof qualities.

Molded on the lower shell are support members such as 70. The transmitter 68 is provided with a plurality of finned shielding members such as 55. The transmitter 68 is electrically connected to the transmitter antenna 51 by way of an antenna power supply wire 54. A coiled spring 52 forming the base of the antenna 51 is integrally mounted in an antenna mounting board 50 in the upper shell 31. Directly above the antenna 51 is illustrated a typical flight stabilizing cap 33 with its aerodynamic stabilizing fins 26 and 27.

While there have been described what are at present considered to be the preferred embodiments of this invention, it will be obvious to those skilled in the art that various changes and modifications may be made therein without departing from the invention and it is, therefore, aimed in the appended claims to cover all such changes and modifications as fall within the true spirit and scope of the invention.

What is claimed is:
1. A free-falling sonobuoy,
said buoy having a spherical shape and having its center of gravity at a point remote from the geometric center of said spherical buoy,
means to stabilize said buoy during free-fall, said stabilizing means comprising recessed portions on the surface of said spherical buoy, said stabilizing means and remotely located center of gravity cooperating and being adapted to orient and stabilize said buoy in flight, said free-falling sonobuoy having the ability to withstand all resultant forces experienced due to said free-fall.

2. A free-falling sonobuoy,
said buoy having a spherical shape and having its center of gravity at a point remote from the geometric center of said spherical buoy,
means to aerodynamically stabilize said buoy during free-fall,
said buoy having an antenna,
a releasable transducer means,
said antenna mechanically co-operating with said stabilizing means and said transducer means to provide simultaneous ejection of said stabilizing means and antenna erection upon water impact and transducer means release.

3. In the free-falling sonobuoy of claim 2 said transducer means being comprised of a plurality of transducer units.

4. A free-falling sonobuoy,
said buoy having a spherical shape and having its center of gravity at a point remote from the geometric center of said spherical buoy,
means to aerodynamically stabilize said buoy during free-fall,
said buoy having an antenna,
a releasable transducer, and
a buoy flotation stabilizer,
said antenna mechanically co-operating with said aerodynamic stabilizing means and said transducer to provide simultaneous ejection of said stabilizing means and antenna erection upon water impact and release of said body flotation stabilizer and transducer.

5. In the free-falling sonobuoy of claim 4 said buoy flotation stabilizer being comprised of a battery suspended in the water below said spherical buoy and interconnected to said buoy and said transducer.

6. The free-falling sonobuoy of claim 4 in which said transducer has wound thereon a supply of conductive support wire, one end of which is mounted to said buoy and the remainder attached to said transducer to thereby allow said transducer to sink after water impact while maintaining an electrical and mechanical connection to said buoy.

7. In combination with said free-falling sonobuoy of claim 4 a pressure release means connected to said transducer,
said pressure release means having a weight secured thereto to thereby afford an increased rate of descent after water impact of said transducer,
said pressure release means being designed to release said release means and related weight at a predetermined depth.

8. A free-falling sonobuoy,
said buoy having a spherical shape,
said buoy having an opening therein, means to aerodynamically stabilize said buoy during free fall,
a transducer mounted in said buoy to be released on water impact of said buoy,
a retention plate mounted across said opening,
said transducer release being affected by the fracturing of said retention plate by said transducer which fracturing is due to a resultant force on said plate which force is a function of the inertial force of said hydrophone minus the buoyant impact force of said spherical buoy on said water.

9. A free-falling sonobuoy,
said buoy having a spherical shape,
a transmitter amplifier,
a toroidal shaped shock mount having an upper surface with an annular slot therein,
said toroidal shaped shock mount having a lower surface in mating relationship with the inside of said spherical shaped buoy to thereby provide an integral shock resistant unit,
said transmitter amplifier mounted in said annular slot.

10. A free-falling sonobuoy,
said buoy having a spherical shape,
said buoy having a walled cavity therein,
a transducer,
a power source,
said transducer and said power source mounted in said walled cavity to be released from said buoy upon water impact,
a power source support arm having one end pivotally mounted in said walled cavity,
said support arm capable of pivotal movement from a position parallel to said cavity wall, when said power source and transducer are in a stored position, to a position perpendicular to said walled cavity upon release of said power source and said transducer at water impact,
means interconnecting said power source and said transducer to said support arm.

11. In combination with the spherical sonobuoy of claim 10, stop means mounted on said walled cavity to prevent said support arm from pivotal movement past said perpendicular position.

12. An electronic package having a spherical shape,
said spherically shaped package having a truncated hemispherical upper shell portion and a hemispherical lower shell,
said upper and said lower shell being hermetically integrally interconnected to thereby substantially define a sphere,
a flight stabilizing means mounted on said truncated upper shell,
said flight stabilizing means housing an antenna which antenna is mounted integrally on said upper shell truncated portion,
said hemispherical lower shell having a centrally disposed walled cavity therein,
said walled cavity including a hermetic seal and having an opening diametrically opposite said flight stabilizing means,
said walled cavity having mounted therein a power source means and a transducer means to be ejected through said opening upon a water impact,
a releasable retention plate, said retention plate mounted across said opening,
a transmitter,
said transmitter mounted in said sphere formed by said upper and lower shell, said transmitter being mounted around said walled cavity,
said antenna operably connected to said transmitter,
said power source, and said transducer, having an electrical interconnection, said electrical interconnection passing through said hermetic seal in said walled cavity, to thereby provide a compact electronic package.

13. A free-falling sonobuoy,
said buoy having a spherical shape and having its center of gravity at a point remote from the geometric center of said spherical buoy,
means to stabilize said buoy during free fall,
said stabilizing means being comprised of fins mounted on said spherical buoy,
said fins being mounted within the radius of curvature of said spherical buoy,
said buoy having a construction to enable said sonobuoy to withstand without affecting its operation the forces resulting from freely falling into a water environment, 14. In the free-falling sonobuoy of claim 13 wherein said center of gravity is located in a direction diametrically opposed to said flight stabilizing means and said geometric center of said sphere.

References Cited by the Examiner
UNITED STATES PATENTS

| | | | |
|---|---|---|---|
| 2,323,064 | 6/1943 | Lustfield | 343—709 X |
| 2,448,713 | 9/1948 | Hansell | 340—2 |
| 2,790,186 | 4/1957 | Carapellotti | 9—8 |
| 2,885,565 | 5/1959 | Davis | 325—111 X |
| 2,993,118 | 7/1961 | Block et al. | 325—116 |
| 3,024,358 | 3/1962 | Grady | 9—8 |
| 3,037,217 | 6/1962 | Manda | 9—8 |
| 3,074,671 | 1/1963 | Dinolfo et al. | 244—138 |
| 3,093,808 | 6/1963 | Tatnall et al. | 340—2 |

LEWIS H. MYERS, *Primary Examiner.*

CHESTER L. JUSTUS, *Examiner.*